United States Patent
Hwang

(10) Patent No.: US 8,813,064 B2
(45) Date of Patent: Aug. 19, 2014

(54) IMAGE FORMING APPARATUS, SERVICE SYSTEM AND METHOD OF INSTALLING OPEN SERVICES GATEWAY INITIATIVE (OSGI)-BASED SERVICE

(75) Inventor: Ki-young Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1099 days.

(21) Appl. No.: 12/367,763

(22) Filed: Feb. 9, 2009

(65) Prior Publication Data

US 2010/0017797 A1  Jan. 21, 2010

(30) Foreign Application Priority Data

Jul. 18, 2008  (KR) .................. 10-2008-0070134

(51) Int. Cl.
*G06F 9/445* (2006.01)
*G06F 9/44* (2006.01)

(52) U.S. Cl.
USPC ............................ 717/174; 717/106; 717/108

(58) Field of Classification Search
CPC ...................... G06F 8/24–8/30; G06F 8/61
See application file for complete search history.

(56) References Cited

U.S. PATENT DOCUMENTS

| | | | |
|---|---|---|---|
| 7,131,111 B2 | 10/2006 | Passanisi | |
| 7,640,542 B2* | 12/2009 | Herenyi et al. | 717/177 |
| 8,191,039 B2* | 5/2012 | Cacenco et al. | 717/106 |
| 8,230,389 B2* | 7/2012 | Beltowski et al. | 717/108 |
| 8,418,169 B2* | 4/2013 | Ushiku | 717/174 |
| 8,448,163 B2* | 5/2013 | Backhouse | 717/174 |
| 2006/0140144 A1 | 6/2006 | Bruner et al. | |
| 2006/0233126 A1* | 10/2006 | Herenyi et al. | 370/328 |
| 2007/0234349 A1* | 10/2007 | Ushiku | 717/174 |

FOREIGN PATENT DOCUMENTS

| | | |
|---|---|---|
| KR | 2006-45085 | 5/2006 |
| KR | 2007-61261 | 6/2007 |

OTHER PUBLICATIONS

Schmidt et al., Decentralised dynamic code management for OSGi, Apr. 2008, 5 pages.*
Ahn et al., Towards reliable OSGi framework and applications, Apr. 2006, 6 pages.*
Rellermeyer et al., R-OSGi: distributed applications through software modularization, Nov. 2007, 20 pages.*

* cited by examiner

*Primary Examiner* — Thuy Dao
(74) *Attorney, Agent, or Firm* — Staas & Halsey LLP

(57) ABSTRACT

A method of installing an Open Services Gateway initiative (OSGi)-based service, the method including: accessing characteristic information associated with an OSGi bundle; generating a virtual Java Archive (JAR) file using the accessed characteristic information; and installing the generated virtual JAR file on an OSGi framework. Accordingly, there is no need to generate a separate JAR file, and user convenience is thus increased.

16 Claims, 5 Drawing Sheets

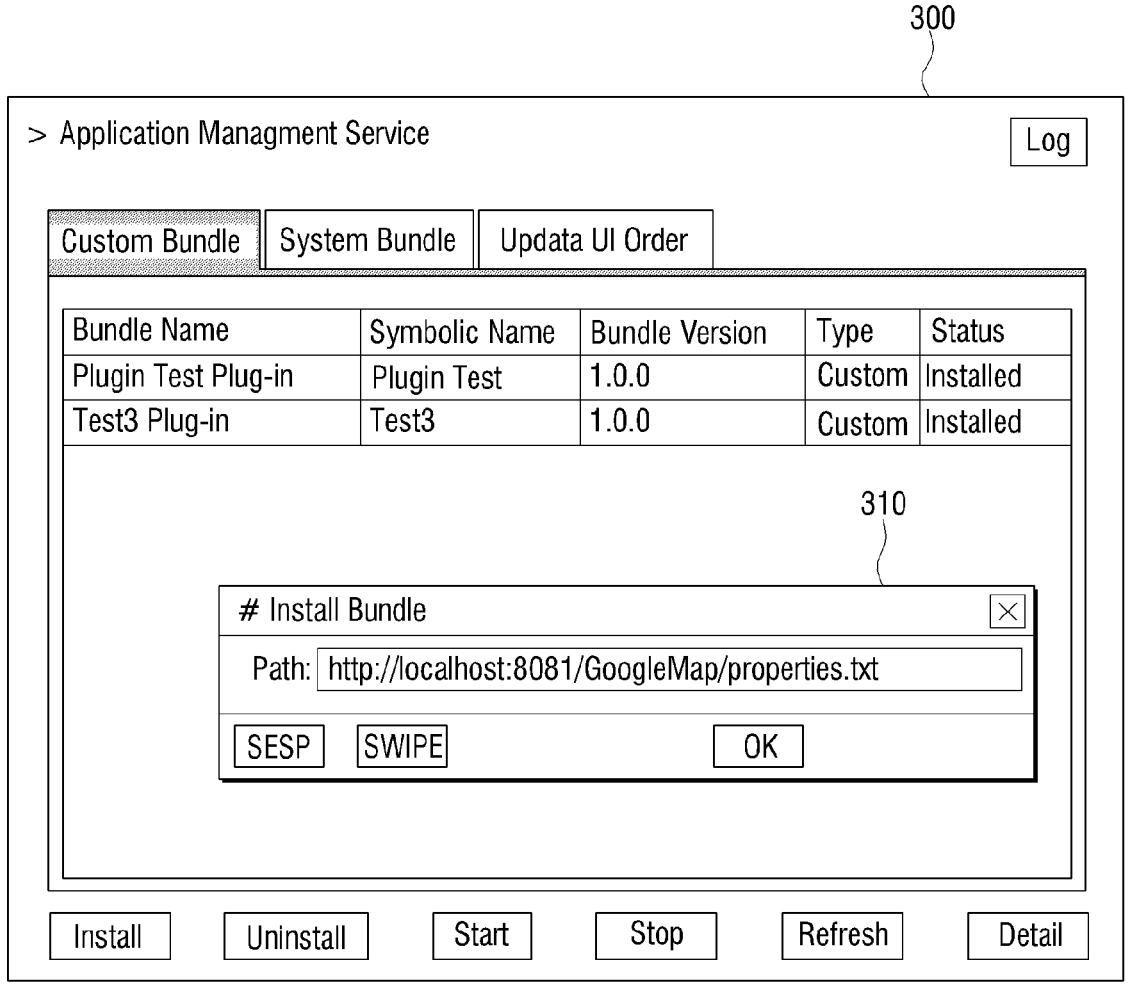

FIG. 4

```
MANIFEST

ApplicationVersion: 1.0.0
ApplicationName: Test Bundle OSGI
ApplicationDescription: TEST Sample Bundle from Remote site
ApplicationImageURL: http://myaddress/images/doc_p.gif
ApplicationAliasURL: http://myaddress/ShrdDocLst.aspx
ApplicationAccessLocation: Remote
ApplicationKind: SWIPE
ApplicationType: Custom
ApplicationSecurityLevel: Medium
```

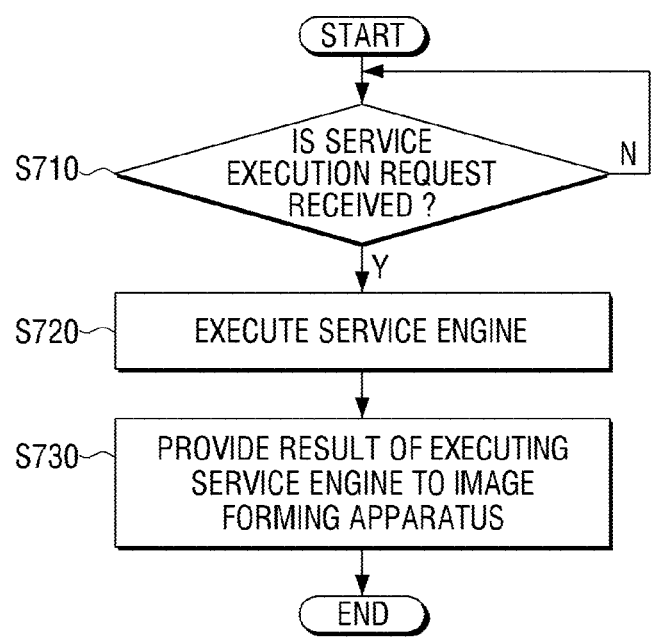

IMAGE FORMING APPARATUS, SERVICE SYSTEM AND METHOD OF INSTALLING OPEN SERVICES GATEWAY INITIATIVE (OSGI)-BASED SERVICE

CROSS-REFERENCE TO RELATED APPLICATIONS

This application claims the benefit of Korean Application No. 2008-70134, filed Jul. 18, 2008 in the Korean Intellectual Property Office, the disclosure of which is incorporated herein by reference.

BACKGROUND OF THE INVENTION

1. Field of the Invention

Aspects of the present invention relate to an image forming apparatus, a service system, and a method of installing an Open Services Gateway initiative (OSGi)-based service. More particularly, aspects of the present invention relate to an image forming apparatus to install an OSGi bundle in an OSGi framework, a service system, and a method of installing an OSGi-based service.

2. Description of the Related Art

The rapid development of digital technologies and growth of the Internet have enabled users to be provided with various services through digital home construction. Digital home technologies provide more varied services using external communication infrastructures relative to home networking technologies for sharing over high speed Internet connections, file sharing, and sharing between neighboring apparatuses.

Such digital home technologies provide a platform standard for various services, such as an Open Services Gateway initiative (OSGi) service platform operated using a Java virtual machine (JVM). The OSGi service platform provides basic services using the Hypertext Transfer Protocol (HTTP), service management, and/or log services on an OSGi framework. Service providers provide services by distributing their respective services using the OSGi framework in the form of bundles. The OSGi service platform supports conventional home network technologies (such as Universal Plug and Play (UPnP), Jini, and/or Home Audio Video interoperability (HAVi)) so that the OSGi service platform can be applied in various environments (such as a set-top box (STB) of a television (TV), a cable modem, an alarm system, and/or an energy management system).

An application programming interface (API) of the OSGi service platform is written in Java, so the API can run on various platforms having diverse operating systems (OS). However, service providers write applications to provide services on the OSGi framework in Java, and provide a user with a single file containing a plurality of class files (such as Java Archive (JAR) files), to distribute services in the form of bundles, which may cause an inconvenience.

Additionally, in order to distribute services to a service providing apparatus, the service providing apparatus requires sufficient storage space on which JAR files may be stored, so there is a limitation in the number of services that may be provided to the service providing apparatus.

SUMMARY OF THE INVENTION

Aspects of the present invention provide an image forming apparatus to access characteristic information associated with an Open Services Gateway initiative (OSGi) bundle and to automatically generate a virtual bundle able to provide a service described in the OSGi bundle so as to provide the service without installing a service engine, a service system, and a method of installing an OSGi-based service.

According to an aspect of the present invention, there is provided a method of installing an Open Services Gateway initiative (OSGi)-based service, the method including: accessing characteristic information associated with an OSGi bundle; generating a virtual Java Archive (JAR) file using the accessed characteristic information; and installing the generated virtual JAR file on an OSGi framework.

The characteristic information may be a text file or a web page.

The characteristic information may include environment setting values used to install the OSGi bundle in the OSGi framework.

The characteristic information may include a uniform resource locator (URL) of a service engine associated with the OSGi bundle, information on a user interface related to the OSGi bundle, and/or information on a service provided by the OSGi bundle.

The generating of the virtual JAR file may include generating a virtual manifest file and a virtual activator file using the accessed characteristic information, and generating the virtual JAR file using the generated virtual manifest file and virtual activator file.

The virtual manifest file may include a name of a service provided by the OSGi bundle, information on a position of an icon corresponding to the service, and/or information on a URL of a service engine associated with the OSGi bundle.

According to another aspect of the present invention, there is provided a method of providing an Open Services Gateway initiative (OSGi)-based service in an image forming apparatus, the method including: receiving a request to execute an installed service using characteristic information associated with an OSGi bundle; and connecting to a uniform resource locator (URL) of a service engine associated with the OSGi bundle to provide a service defined in the OSGi bundle.

According to another aspect of the present invention, there is provided a method, by a terminal apparatus connected to an image forming apparatus, of providing an Open Services Gateway initiative (OSGi)-based service, the method including: receiving a request to execute an installed service using characteristic information associated with an OSGi bundle, from the image forming apparatus; executing a service engine for the service; and providing a result of executing the service engine to the image forming apparatus.

The service engine may be implemented as a web page.

According to yet another aspect of the present invention, there is provided an image forming apparatus to provide an Open Services Gateway initiative (OSGi)-based service, the image forming apparatus including: an interface unit to access characteristic information associated with an Open Services Gateway initiative (OSGi) bundle; a Java Archive (JAR) generating unit to generate a virtual JAR file using the accessed characteristic information; and a control unit to install the generated virtual JAR file on an OSGi framework.

The characteristic information may be a text file or a web page.

The characteristic information may include environment setting values used to install the OSGi bundle in the OSGi framework.

The characteristic information may include a uniform resource locator (URL) of a service engine associated with the OSGi bundle, information on a user interface related to the OSGi bundle, and information on a service provided by the OSGi bundle.

The JAR generating unit may generate a virtual manifest file and a virtual activator file using the accessed characteristic information, and generate the virtual JAR file using the generated virtual manifest file and virtual activator file.

The virtual manifest file may include a name of a service provided by the OSGi bundle, information on a position of an icon corresponding to the service, and/or information on a URL of a service engine associated with the OSGi bundle.

The control unit may connect to a URL of a service engine associated with the OSGi bundle to provide a service defined in the OSGi bundle.

According to still another aspect of the present invention, there is provided a service system providing an Open Services Gateway initiative (OSGi)-based service, the service system including: a terminal apparatus to store characteristic information associated with an Open Services Gateway initiative (OSGi) bundle; and an image forming apparatus to access the characteristic information from the terminal apparatus, to generate a virtual Java Archive (JAR) file using the accessed characteristic information, and to install the generated virtual JAR file in an OSGi framework.

The characteristic information may be a text file or a web page.

The characteristic information may include environment setting values used to install the OSGi bundle in the OSGi framework.

The characteristic information may include information on a uniform resource locator (URL) os a service engine associated with the OSGi bundle, information on a user interface related to the OSGi bundle, and/or information on a service provided by the OSGi bundle.

The image forming apparatus may include: an interface unit to access the characteristic information stored in the terminal apparatus; a JAR generating unit to generate the virtual JAR file using the accessed characteristic information; and a control unit to install the generated virtual JAR file on the OSGi framework.

The JAR generating unit may generate a virtual manifest file and a virtual activator file using the characteristic information, and generate the virtual JAR file using the generated virtual manifest file and the generated virtual activator file.

The virtual manifest file may include a name of a service provided by the OSGi bundle, information on a position of an icon corresponding to the service, and information on a URL of a service engine associated with the OSGi bundle.

The control unit may connect to a URL of a service engine associated with the OSGi bundle to provide a service defined in the OSGi bundle.

According to another aspect of the present invention, there is provided a method of providing an Open Services Gateway initiative (OSGi)-based service, the method including: accessing, from an external source, characteristic information associated with an OSGi bundle; generating a virtual Java Archive (JAR) file using the accessed characteristic information; installing the generated virtual JAR file on an OSGi framework; accessing a URL of a service engine associated with the OSGi bundle using the generated virtual JAR file; and providing a service according to an operation of the service engine and a result of the operation of the service engine, wherein the characteristic information comprises information on the URL of the service engine.

According to another aspect of the present invention, there is provided a terminal apparatus connected to an image forming apparatus to provide an Open Services Gateway initiative (OSGi)-based service, the terminal apparatus including: an interface unit to receive a request to execute an installed service using characteristic information associated with an OSGi bundle, from the image forming apparatus; and a control unit to execute a service engine for the service, and to provide a result of executing the service engine to the image forming apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates a user interface window to receive an address containing characteristic information associated with an Open Services Gateway initiative (OSGi) bundle from a terminal apparatus of the service system of FIG. 1;

FIG. 4 illustrates a virtual manifest file according to an embodiment of the present invention;

FIGS. 6 and 7 are flowcharts explaining a method of providing an OSGi-based service according to an embodiment of the present invention.

DETAILED DESCRIPTION OF THE EMBODIMENTS

Figure 1:
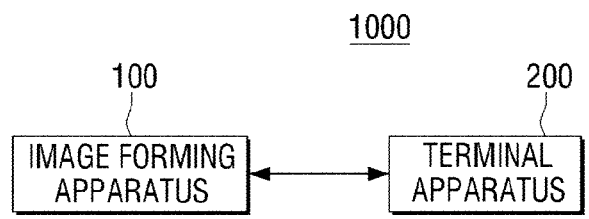
FIG. 1 is a block diagram of a service system according to an embodiment of the present invention.

Reference will now be made in detail to the exemplary embodiments of the present invention, examples of which are illustrated in the accompanying drawings, wherein like reference numerals refer to like elements throughout. The embodiments are described below in order to explain the aspects of the present invention by referring to the figures.

FIG. 1 is a block diagram of a service system 1000 according to an embodiment of the present invention. Referring to FIG. 1, the service system 1000 includes an image forming apparatus 100 and a terminal apparatus 200. The terminal apparatus 200 stores characteristic information associated with an Open Services Gateway initiative (OSGi) bundle in the form of a text file or a web page using a markup language (such as HyperText Markup Language (HTML)). Accordingly, the terminal apparatus 200 is implemented as any apparatus to provide the characteristic information associated with the OSGi bundle to the image forming apparatus 100. For example, the terminal apparatus 200 may be a personal computer (PC), a server, a personal digital assistance (PDA), a mobile phone, a digital camera, a digital video camera, or a point of sale (POS) terminal.

The characteristic information associated with the OSGi bundle is environment setting values used to register the OSGi bundle to an OSGi framework, and may include, for example, information on a service provided by the OSGi bundle (such as the service name and/or a service version), information on a uniform resource locator (URL) of a service engine associated with the OSGi bundle, and/or information on a user interface related to the OSGi bundle. Here, the information on the user interface may be used to inform a user of the name or operation of a service in the form of an icon, and may include information on the position in which icon data is stored. Such characteristic information associated with the OSGi bundle may be generated using Java Archive (JAR) files formed to distribute a conventional OSGi bundle.

Here, services refer to various operations provided by an OSGi-based apparatus. For example, if the OSGi-based apparatus is an image forming apparatus, the services may include facsimile transmission, copying, and/or printing provided by the image forming apparatus. Additionally, the services may include an operation that is only supported by an image forming apparatus in which an OSGi bundle is installed (such as transmission of a facsimile document to a predetermined mail address).

The terminal apparatus 200 provides the stored characteristic information to the image forming apparatus 100. Specifically, the terminal apparatus 200 may transmit position information and/or a URL address of the characteristic information to the image forming apparatus 100, in response to a request from the image forming apparatus 100. For example, if the characteristic information is stored as a web page, the terminal apparatus 200 may provide the image forming apparatus 100 with the URL address of the web page. However, it is understood that aspects of the present invention are not limited thereto. For example, the terminal apparatus 200 may transmit the characteristic information directly to the image forming apparatus 100, or may transmit the URL address of characteristic information associated with the OSGi bundle stored in an external server (not shown) to the image forming apparatus 100, without storing the characteristic information associated with the OSGi bundle.

The terminal apparatus 200 includes a service engine corresponding to the OSGi bundle. Specifically, the service engine of the terminal apparatus 200 performs predetermined operations in response to the request from the image forming apparatus 100, and sends the result thereof to the image forming apparatus 100. It is understood that the service engine may be implemented in the form of web pages, rather than an OSGi framework, and may be written in programming languages other than Java.

The image forming apparatus 100 accesses the characteristic information associated with the OSGi bundle from the terminal apparatus 200, generates a virtual JAR file, and installs the generated JAR file on the OSGi framework. The image forming apparatus 100 may be implemented as a copier, a printer, a facsimile machine, or a multifunctional peripheral (MFP) combining operations of one or more of those devices.

Figure 2:
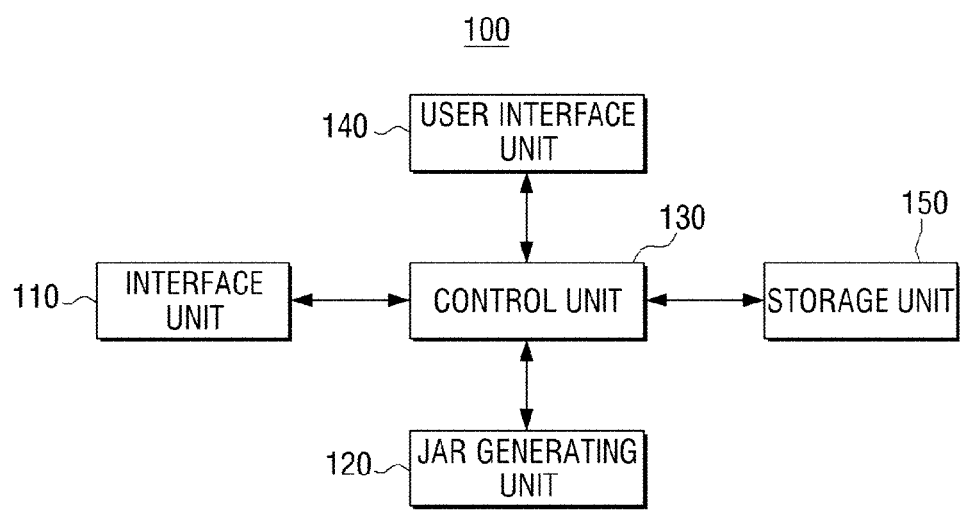
FIG. 2 is a block diagram of an image forming apparatus of the service system of FIG. 1 according to an embodiment of the present invention.

Hereinafter, the configuration and operations of the image forming apparatus 100 will be described in detail. FIG. 2 is a block diagram of the image forming apparatus 100 according to an embodiment of the present invention. Referring to FIG. 2, the image forming apparatus 100 includes an interface unit 110, a JAR generating unit 120, a control unit 130, a user interface unit 140, and a storage unit 150.

The interface unit 110 accesses the characteristic information associated with the OSGi bundle. Specifically, if an address in which an OSGi bundle install command and the characteristic information associated with the OSGi bundle are stored is received from the terminal apparatus 200, the interface unit 110 accesses the characteristic information associated with the OSGi bundle using the received address.

The address at which the characteristic information associated with the OSGi bundle is stored may be a storage address in the terminal apparatus 200, or a URL address of the characteristic information associated with the OSGi bundle provided in the form of web pages. Additionally, the interface unit 110 may receive the address from the terminal apparatus 200, or a user may directly receive the address via the user interface unit 140. The user interface unit 140 may be able to simultaneously implement input and output (such as a touch pad). However, it is understood that aspects of the present invention are not limited thereto. For example, the user interface unit 140 may include separate devices for input and output (such as a mouse and a monitor).

Additionally, the interface unit 110 may periodically access a preset address in the terminal apparatus 200. If characteristic information associated with a new OSGi bundle is found, the interface unit 110 may allow the new OSGi bundle to be installed. The characteristic information accessed as described above may be temporarily stored in the storage unit 150 of the image forming apparatus 100, and the user interface unit 140 may notify a user that there is a new OSGi bundle to be installed. If the user enters the OSGi bundle install command, the new OSGi bundle is installed. The storage unit 150 may be a memory mounted inside the image forming apparatus 100 (for example, a read-only memory (ROM), a flash memory, or a hard disk drive (HDD)), or may be an external HDD or memory card connected to the image forming apparatus 100 (for example, a Memory Stick (MS), an extreme Digital (xD) picture card, a Secure Digital (SD) card, or a user serial bus (USB) memory).

The JAR generating unit 120 generates a virtual JAR file using the characteristic information associated with the OSGi bundle. Specifically, the JAR generating unit 120 generates a virtual manifest file and/or a virtual activator file using the characteristic information associated with the OSGi bundle accessed by the interface unit 110. In more detail, the JAR generating unit 120 generates a virtual activator file to connect to the web page of the service engine, using the characteristic information associated with the OSGi bundle. An activator file registers services to the OSGi framework. However, since the service engine related to the OSGi bundle according to an embodiment of the present invention is not installed in the image forming apparatus 100, the virtual activator file may be formed to register a service to connect a URL of the service engine to the OSGi framework. Additionally, the JAR generating unit 120 generates a virtual manifest file used to operate services. The virtual manifest file will be described in detail with reference to FIG. 4.

FIG. 4 illustrates a virtual manifest file according to an embodiment of the present invention. Hereinafter, a process of generating a virtual manifest file will be described. Referring to FIG. 4, a manifest file contains information regarding bundles and is used to manage bundles in the OSGi framework. Information regarding the bundle name and service engine address may include "ApplicationVersion," "ApplicationName," "ApplicationDescription," "ApplicationImageURL," "ApplicationAliasURL," "ApplicationAccessLocation," "ApplicationKind," "ApplicationType," and "ApplicationSecurityLevel" of the manifest file. The JAR generating unit 120 compresses the generated virtual manifest file and activator file in the form of a JAR format, to create a virtual JAR file.

The control unit 130 installs the virtual JAR file created by the JAR generating unit 120 in the OSGi framework. The virtual JAR file may be installed in the OSGi framework in the same manner as an actual JAR file in the OSGi framework, so no further description thereof will be provided herein. The control unit 130 provides a service defined in the installed OSGi bundle. Specifically, if a user enters a command to start the service defined in the installed OSGi bundle, the control unit 130 accesses, for example, a web page forming the service engine for the installed OSGi bundle by referring to the "ApplicationAliasURL" described in the virtual manifest file.

Additionally, the control unit 130 may perform various operations in the image forming apparatus 100 in response to operations of the service engine performed by the terminal apparatus 200.

Accordingly, the image forming apparatus 100 generates the virtual JAR file related to the OSGi bundle and installs the virtual JAR file in the OSGi framework, so that a user can easily install the OSGi bundle in the image forming apparatus 100 from a remote location. Additionally, the service engine for the OSGi bundle is provided from web pages outside the image forming apparatus 100, so an application may be written using various programming languages other than Java (such as C or PHP).

While the terminal apparatus 200 may, although not necessarily, store the characteristic information associated with the OSGi bundle and provides the service engine as described above with reference to FIGS. 1 and 2, it is understood that, according to other aspects, more than one apparatus can provide the characteristic information associated with the OSGi bundle and service engine. Accordingly, aspects of the present invention are equally applicable to a plurality of terminal apparatuses that store characteristic information associated with the OSGi bundle and provide service engines.

FIG. 3 illustrates a user interface window 300 to receive an address of the characteristic information associated with the OSGi bundle from the terminal apparatus 200. Referring to FIG. 3, the user interface window 300 displays information regarding a service provided by the image forming apparatus 100. The user interface window 300 may be provided in the form of a web page. The user interface window 300 enables a user to manage OSGi bundles installed in the image forming apparatus 100, and to install a new OSGi bundle in the image forming apparatus 100. Specifically, the user interface window 300 enables a user to input a URL of a web page containing the characteristic information associated with the OSGi bundle, or a predetermined address for the terminal apparatus 200 in an address input field 310. The input address is then transmitted to the image forming apparatus 100, such that the process described with reference to FIGS. 1 and 2 can be performed. Accordingly, it is possible for a user to easily install the OSGi bundle in the image forming apparatus 100 from a remote location, and to control operations of the installed OSGi bundle using information regarding the OSGi bundle installed in the image forming apparatus 100.

Figure 5:
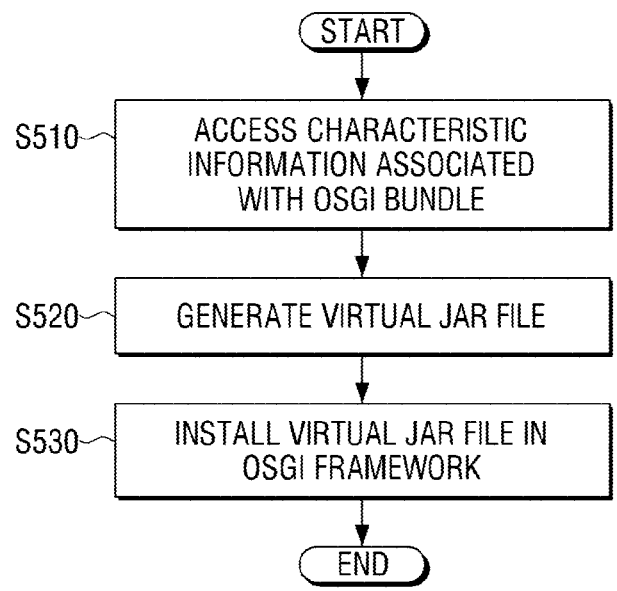
FIG. 5 is a flowchart explaining a method of installing an OSGi-based service according to an embodiment of the present invention.

FIG. 5 is a flowchart explaining a method of installing an OSGi-based service according to an embodiment of the present invention. Referring to FIG. 5, the characteristic information associated with the OSGi bundle is accessed in operation S510. Specifically, if an address containing the OSGi bundle install command and characteristic information associated with the OSGi bundle is received, the image forming apparatus 100 accesses the characteristic information associated with the OSGi bundle stored in the terminal apparatus 200, a server, and/or an external storage device using the received address. As described above, the characteristic information associated with the OSGi bundle contains environment setting values used to register an OSGi bundle to an OSGi framework, and may be stored in the form of a text file or a web page using a markup language such as HTML.

If the image forming apparatus 100 finds characteristic information associated with a new OSGi bundle while periodically accessing the preset address, operation 510 described above is performed again. In this situation, the image forming apparatus 100 informs the user that the new OSGi bundle able to be installed has been found. If the user enters the OSGi bundle install command, the new OSGi bundle is installed.

A virtual JAR file is generated using the accessed characteristic information associated with the OSGi bundle in operation S520. Specifically, the image forming apparatus 100 generates a virtual manifest file and virtual activator file using the accessed characteristic information, compresses the generated virtual manifest file and virtual activator file, and generates a virtual JAR file. The process of generating the virtual manifest file and virtual activator file has been described above, so a further description thereof is omitted herein.

The generated virtual JAR file is installed in the OSGi framework in operation S530. Accordingly, service providers who desire to distribute OSGi bundles may install OSGi bundles without generating a separate JAR file.

Figure 6:
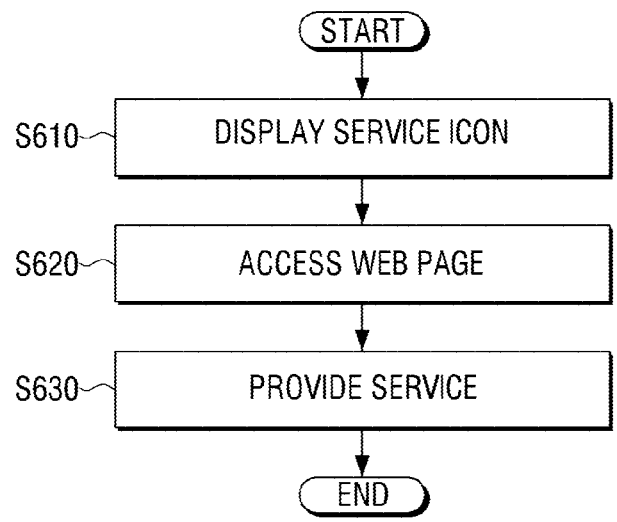

FIG. 6 is a flowchart explaining a method by which the image forming apparatus 100 provides the OSGi-based service according to an embodiment of the present invention. Referring to FIG. 6, if the OSGi bundle is installed in the image forming apparatus 100 in the same manner as described above with reference to FIG. 5, an identifier (such as a name) of a service defined in the installed OSGi bundle is displayed to a user on the image forming apparatus 100 in operation S610. In more detail, the name of the service defined in the installed OSGi bundle or a service icon indicating the service may be displayed, so the user may know which service is provided. As an example, the image forming apparatus 100 may access an address for an external service icon file and display the service icon.

In this situation, if the user selects the displayed service icon or if a request for other services related to the OSGi bundle described above is received, the image forming apparatus 100 accesses the URL of the service engine stored in the virtual manifest file in operation S620.

The image forming apparatus 100 provides, to the user, the service corresponding to the operation of the service engine at the accessed URL in operation S630. Specifically, if the user enters the command to start the service defined in the installed OSGi bundle, the image forming apparatus 100 may access a web page forming the service engine for the installed OSGi bundle, based on the "ApplicationAliasURL" described in the virtual manifest file. Additionally, the image forming apparatus 100 may perform various operations in order to provide the user with services in response to the operation of the service engine on the connected web page.

FIG. 7 is a flowchart explaining a method of providing the OSGi-based service by an apparatus having a service engine according to an embodiment of the present invention. Referring to FIG. 7, if a service execution request is received, in operation S710, from a service providing apparatus in which an OSGi bundle is installed, (i.e., if the image forming apparatus 100 accesses the URL of the service engine), the apparatus having the service engine performs service operations according to the service engine in operation S720. The service providing apparatus having the service engine then provides the service providing apparatus with the service operations together with the results thereof in operation S730. In other words, the apparatus having the service engine transmits the result of executing the service engine in the form of a web page to the service providing apparatus.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus.

Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method executed by a processor of installing an Open Services Gateway initiative (OSGi)-based service, the method comprising:
    accessing, from an external source, characteristic information associated with an OSGi bundle;
    generating a virtual Java Archive (JAR) file including a virtual activator file and a virtual manifest file using the accessed characteristic information;
    installing the generated virtual JAR file in an OSGi framework;
    displaying information on a user interface window to a user regarding a service provided by the method including an identifier of the installed service; accessing a URL of a service engine associated with the OSGi bundle using the generated virtual JAR file; and
    providing a service according to an operation of the service engine and a result of the operation of the service engine,
    wherein the characteristic information comprises information on the URL of the service engine,
    wherein the accessing of the URL of the service engine comprises:
        displaying a service icon corresponding to the service engine, and
        receiving a user selection of the service icon corresponding to the service engine,
    wherein the service engine is implemented as one or more web pages.

2. The method as claimed in claim 1, wherein the characteristic information is stored as a text file or a web page.

3. The method as claimed in claim 1, wherein the characteristic information comprises environment setting values used to install the OSGi bundle in the OSGi framework.

4. The method as claimed in claim 1, wherein the characteristic information comprises information on a uniform resource locator (URL) of a service engine associated with the OSGi bundle, information on a user interface related to the OSGi bundle, and/or information on a service provided by the OSGi bundle.

5. The method as claimed in claim 1, wherein the virtual manifest file comprises a name of a service provided by the OSGi bundle, information on a position of an icon corresponding to the service, and/or information on a URL of a service engine associated with the OSGi bundle.

6. The method as claimed in claim 1, further comprising:
    receiving a URL of the external source and/or a storage address of the characteristic information in the external source.

7. The method as claimed in claim 1, further comprising:
    periodically accessing the external source to determine if characteristic information of a new OSGi bundle is stored therein.

8. The method as claimed in claim 1, wherein the accessing of the characteristic information comprises accessing the characteristic information from a plurality of external sources.

9. The method as claimed in claim 1, wherein the installing of the generating virtual JAR file comprises installing the generated virtual JAR file in an image forming apparatus.

10. An image forming apparatus having a processor providing an Open Services Gateway initiative (OSGi)-based service, the image forming apparatus comprising:
    an interface unit to access, from an external source, characteristic information associated with an OSGi bundle;
    a Java Archive (JAR) generating unit to generate a virtual JAR file including a virtual activator file and a virtual manifest file using the accessed characteristic information;
    a control unit to install the generated virtual JAR file in an OSGi framework; and
    a display to display information to a user regarding a service provided by the image forming apparatus,
    wherein the control unit, using the generated virtual JAR file, connects to a URL of a service engine associated with the OSGi bundle to provide a service defined in the OSGi bundle, and display a service icon corresponding to the service engine implemented as one or more web pages.

11. The image forming apparatus as claimed in claim 10, wherein the characteristic information is stored as a text file or a web page.

12. The image forming apparatus as claimed in claim 10, wherein the characteristic information comprises environment setting values used to install the OSGi bundle in the OSGi framework.

13. The image forming apparatus as claimed in claim 10, wherein the characteristic information comprises information on a uniform resource locator (URL) of a service engine associated with the OSGi bundle, information on a user interface related to the OSGi bundle, and/or information on a service provided by the OSGi bundle.

14. The image forming apparatus as claimed in claim 10, wherein the virtual manifest file comprises a name of a service provided by the OSGi bundle, information on a position of an icon corresponding to the service, and/or information on a URL of a service engine associated with the OSGi bundle.

15. A service system having a processor providing an Open Services Gateway initiative (OSGi)-based service, the service system comprising:
    a terminal apparatus to store characteristic information associated with an Open Services Gateway initiative (OSGi) bundle;
    an image forming apparatus to access the characteristic information from the terminal apparatus, to generate a virtual Java Archive (JAR) file including a virtual activator file and a virtual manifest file using the accessed characteristic information, and to install the generated virtual JAR file in an OSGi framework; and
    a display to display information to a user regarding a service provided by the image forming apparatus,
    wherein the image forming apparatus, using the generated virtual JAR file, connects to a URL of a service engine associated with the OSGi bundle to provide a service defined in the OSGi bundle, and display a service icon corresponding to the service engine implemented as one or more web pages.

16. The service system as claimed in claim 15, wherein the image forming apparatus comprises:
- an interface unit to access the characteristic information stored in the terminal apparatus;
- a JAR generating unit to generate the virtual JAR file using the accessed characteristic information; and
- a control unit to install the generated virtual JAR file on the OSGi framework.

* * * * *